Dec. 5, 1967 TAKEO SATO 3,356,216
OIL INDICATOR-MAGNETIC FILTER APPARATUS
Filed May 1, 1967 3 Sheets-Sheet 3
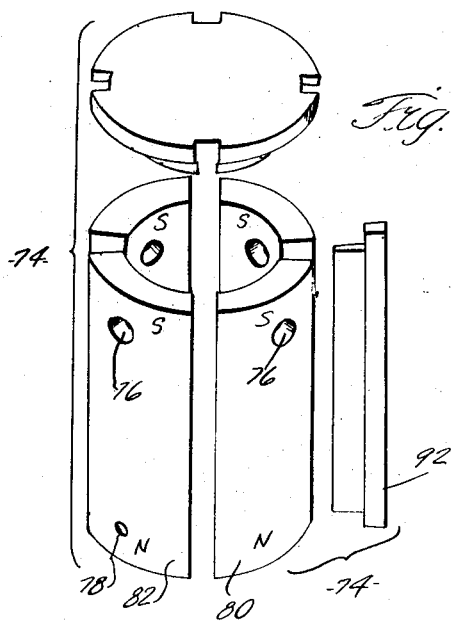
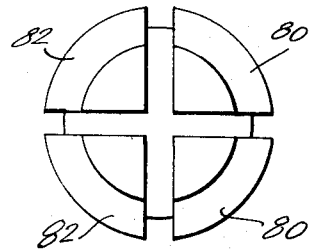
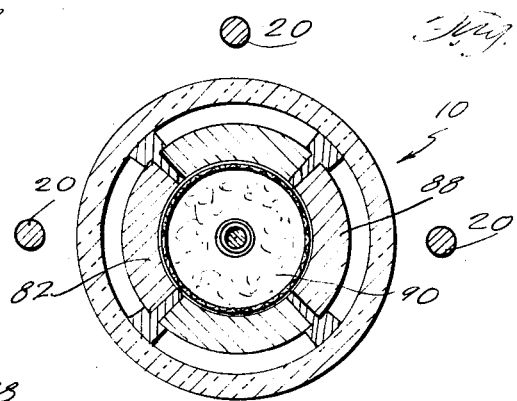
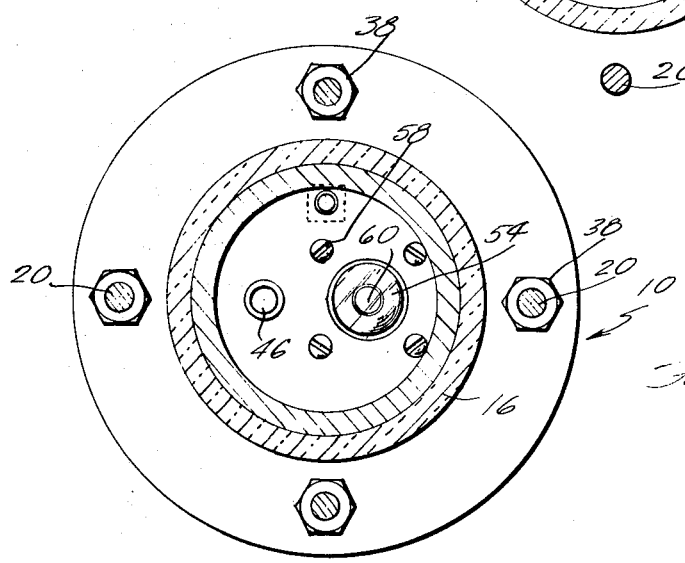
INVENTOR.
TAKEO SATO
BY
ATTORNEYS

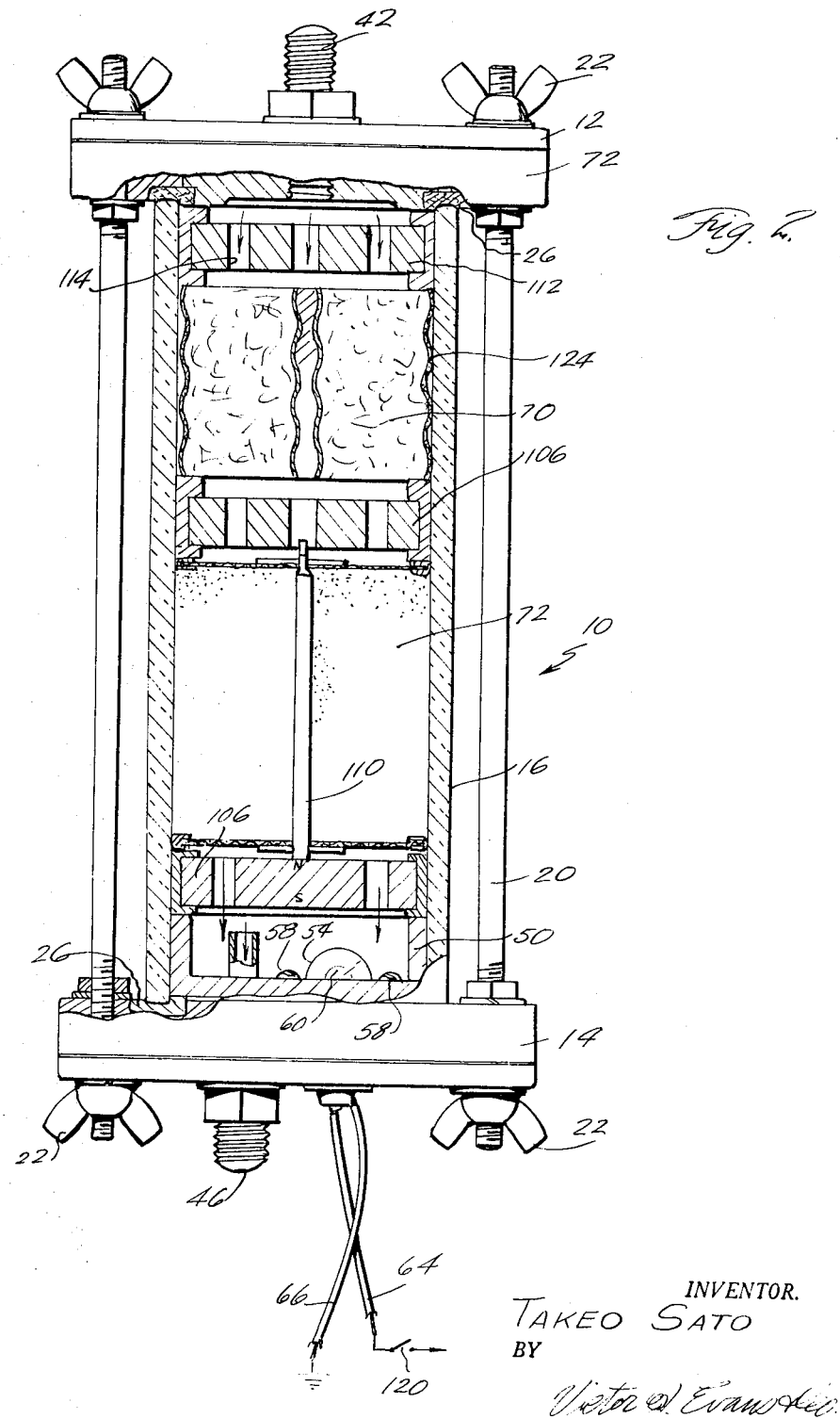

United States Patent Office 3,356,216
Patented Dec. 5, 1967

3,356,216
OIL INDICATOR-MAGNETIC FILTER APPARATUS
Takeo Sato, 3354 Maunalua Ave.,
Honolulu, Hawaii 96821
Filed May 1, 1967, Ser. No. 635,166
4 Claims. (Cl. 210—94)

ABSTRACT OF THE DISCLOSURE

A magnetic refinalized oil indicator filter for automobiles, trucks and other vehicles having internal combustion engines, comprising a transparent housing, inlet and outlet means at the opposite ends of the housing, magnets and filter means within the housing and a light adjacent the outlet means whereby the condition of the filter may be determined.

---

The invention relates to methods and apparatus for promoting improved conditions of engine oil that has become worn or soiled by collection of compound impurities upon circulating of the oil through the internal operating parts of the internal combustion engine during operation, and more particularly the invention relates to maintaining clear refinalized or filtered oil that has become previously contaminated or soiled by collection of compound impurities so that the lubricating effectiveness and strength of the oil is longer for promoting longer engine life as well as the life of the oil, and providing an oil indicator that is visually and readily perceived.

It has been found that oil becomes worn, or as called herein soiled, by collection of compound impurities from circulating and flowing through the internal operating parts of the internal combustion engine, in which metallic dust, powders and other forms of metallic, iron and steel impurities are mixed within the oil due to the wear of the internal operating parts of the engine, as well as the collection of carbonized elements which are found mixed within the oil as a result of combustion.

The objects and features of the present invention are to provide a glass casing having a top and bottom cover, filter elements, magnetic collectors and an internally mounted indicator light in the filter so that the purity or impurity of the filtered oil is observed through the glass casing.

A further object of the present invention is to provide means and apparatus for refinalizing or renewing the lubricating effect of oil that has become soiled or dirty as a result of continued use in internal combustion engines through the collection of combustion products and of metallic dust particles.

The above and other objects and advantages of the invention will become apparent upon full consideration of the following detailed description and accompanying drawings in which:

FIG. 2 is a modification thereof with a different arrangement of magnetic elements and filter bodies forming the zig-zag flow path of oil therethrough for refinalizing or renewing the oil, and showing the indicator light in the bottom cover thereof;

FIG. 3 is a perspective view of a magnetic assembly shown in the upper part of FIG. 1;

FIG. 4 shows an end view from the bottom of the magnetic assembly of FIG. 3;

FIG. 5 shows a cross-sectional view taken along lines 5—5 of FIG. 1; and

FIG. 6 shows a cross-sectional view taken along lines 6—6 of FIG. 1.

Figure 1:
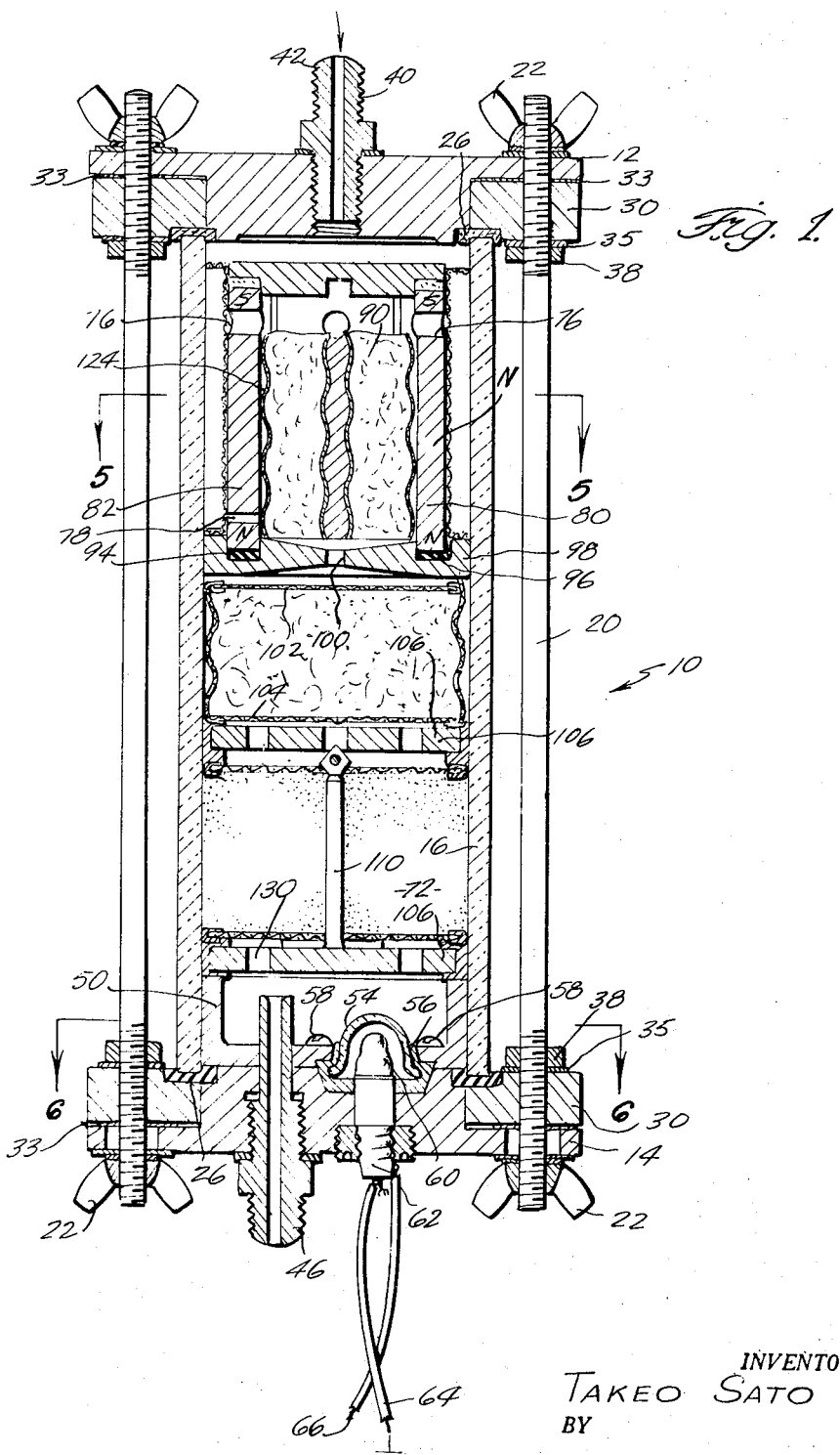
FIG. 1 is a vertical, generally cross-sectional view of a generally cylindrical gas casing having end covers and forming the oil indicator magnetic cleaner filter apparatus of the invention.

Referring now to the drawings, there is shown an oil filter apparatus 10 having a top cover 12 and a bottom cover 14 which are spaced apart by a cylindrical hollow glass shell 16, and in which the covers are retained in their spaced apart position by bolts 20 with threaded ends to which are coupled adjusting lock nuts 22, 22.

A rubber gasket 26, 26 is provided to maintain fluid-tightness characteristics of the glass shell 16 with the covers 12, 14, respectively.

There is also provided a top cover 30 that is axially fitted in and about the outside flanged surface of the covers 12, 14 in which there is also a further rubber gasket means 33, a washer 35 and a lock nut 38 on the bolt 20. In the cover 12, there is a threaded fitting 40 that provides an inlet connection to the interior of the oil filter 10, and is coupled by a threaded connection or nipple 42 to connect with the fuel pump of the internal combustion engine (not shown).

From the bottom cover 14, there is also a coupling for providing outlet of the interior of the filter, shown by outlet coupling 46, to allow the refinalized or renewed oil to flow back into the crankcase or oil pan of said internal combustion engine. The drain oil for the coupling 46 is not mounted axially of the bottom cover 14, but the inlet coupling 42 is shown as being axially disposed in the upper cover 12. Within the glass shell 16, there is at the bottom a base member 50 which may be made of either translucent plastic or transparent plastic or other material such as metal. The coupling 46 extends therethrough for providing a completed zig-zag path of the oil in being processed through the filter.

Also in the bottom cover 14, there is mounted a glass bowl 54 in air-tight relation by a gasket 56 and retained in tight relation by means of screws 58 in the base 50, and within which there is mountedly disposed an electric lamp 60. The electric lamp is mounted in a socket 62 having conductors 64, 66 for energizing the lamp continuously while the engine is in operation. Thus, the lamp may be energized from the ignition circuit or other operative circuit of the automotive vehicle in which the internal combustion engine is mounted.

Within the glass shell 16, there is mounted a plastic or fibrous synthetic resin filter material 70 of coarse material and a similar material of finer construction 72 to provide for circuitous and zig-zag effective path means between the coupling 42 in the top cover and the outlet coupling 46 in the bottom cover. In this way, impurities are collected out by the filter material 70, 72.

There is also disposed within the upper part of the filter casing shown in FIG. 1, a magnetic assembly 74 also shown in exploded view in FIG. 3. The magnetic assembly comprises a series of North-South magnets through which the oil is caused to circulate, as by means of openings 76, 76, so that the oil passes over the magnetic surfaces of circular magnets 80, 82 in an effort to collect substantially all of the magnetic sensitive particles or components that are residual in the dirty or conglomerate oil material, and thus the magnets 80, 82 seek to remove these magnetic sensitive particles or components from the oil in an effort to renew or refinalize the oil passing through the filter.

There is a further zig-zag path effected by the oil passing within holes 78 and material 90 which is similar to materials 70, 72. Interposed between the magnetic elements 80, 82 is a receiver means 92 that may be used to isolate the magnetic circuits of the respective elements, or it may be of magnetic material for completing the magnetic circuits caused by the several magnets 80, 82 and others. The magnets rest on an elastomeric material 94 which is seen imbedded within a recess 96 of a disc 98 in which there is axially disposed therein an opening 100. The oil thus having passed the surfaces of the magnets 80, 82 through apertures 76, 78, is then passed through aperture 100 through a filter 102, then to material 70 and then again through a filter 104, all the while constituting a devious and zig-zag path through the material constituting the filter material 70.

There is also provided magnetic components 106 that further seek to collect and remove magnetic sensitive material from the oil. Each of the magnetic components 106, 106 is separated by a shaft or staff member 110. In the upper part of the filter apparatus of FIG. 2, a magnetic assembly is more simply shown as a magnetic disc 112 having several apertures 114 passing therethrough for allowing the contaminated or dirty oil to engage the magnetic surfaces of the magnet 112.

In FIG. 2 there is schematically shown an arrangement in which one of the wires 66 is shown grounded and the other is connected to a switch 120.

The material 70 may be a charcoal substance within a charcoal container 124, and is used to clean the oil as shown in FIGS. 1 and 2. The synthetic resin 72 promotes electrostatic cleaning and removal of impurities from the oil without losing the original lubricating effects of the oil as it is refined and refinalized.

The filter device of the present invention with the glass shell cylinder 16 as a main body part promotes an arrangement for allowing one to see through and observe the oil being refinalized and renewed. The light available from the lamp 60 passing through apertures 130 in the magnet 106 provides a visual indication by observing through the walls about the intermediate portion of the glass shell 16 the condition of the oil as it is being renewed and filtered. Thus while looking through the glass shell, the soiled oil condition is clearly observable and it is noted whether or not the oil is being thoroughly cleared of impurities.

The best results are found when the device of the invention is installed after the internal combustion engine has been thoroughly cleaned and drained of oil and new oil has been added. Thus the crankcase and the oil pan of the engine must be cleaned before new oil is added. Then the invention will provide the results obtained by the arrangement of the several parts in order to provide the necessary indication that the filter is operatively performing the functions that are to be achieved.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. An oil indicator-filter comprising a glass casing having top and bottom covers, an inlet in one cover and an outlet in the other cover for completing a communicative path through the filter glass casing, magnets transversely mounted within the glass casing to impede the flow of oil and to collect magnetic-sensitive components, said path being filled also with synthetic resin filter material to collect other impurities in the oil, and a light within a glass housing mounted within the cover having said outlet.

2. The invention according to claim 1 wherein said covers are metal.

3. The invention according to claim 2 wherein said path between the magnets within the casing forms a substantially zig-zag flow path.

4. The invention according to claim 2 wherein removable bolt elements are provided to enable assembly and disassembly of the component parts.

No references cited.

SAMIH N. ZAHARNA, *Primary Examiner.*